Sept. 6, 1960
C. D. SPANGLER, JR., ET AL
2,951,347
METHOD OF PROCESSING GAS
Filed April 4, 1956
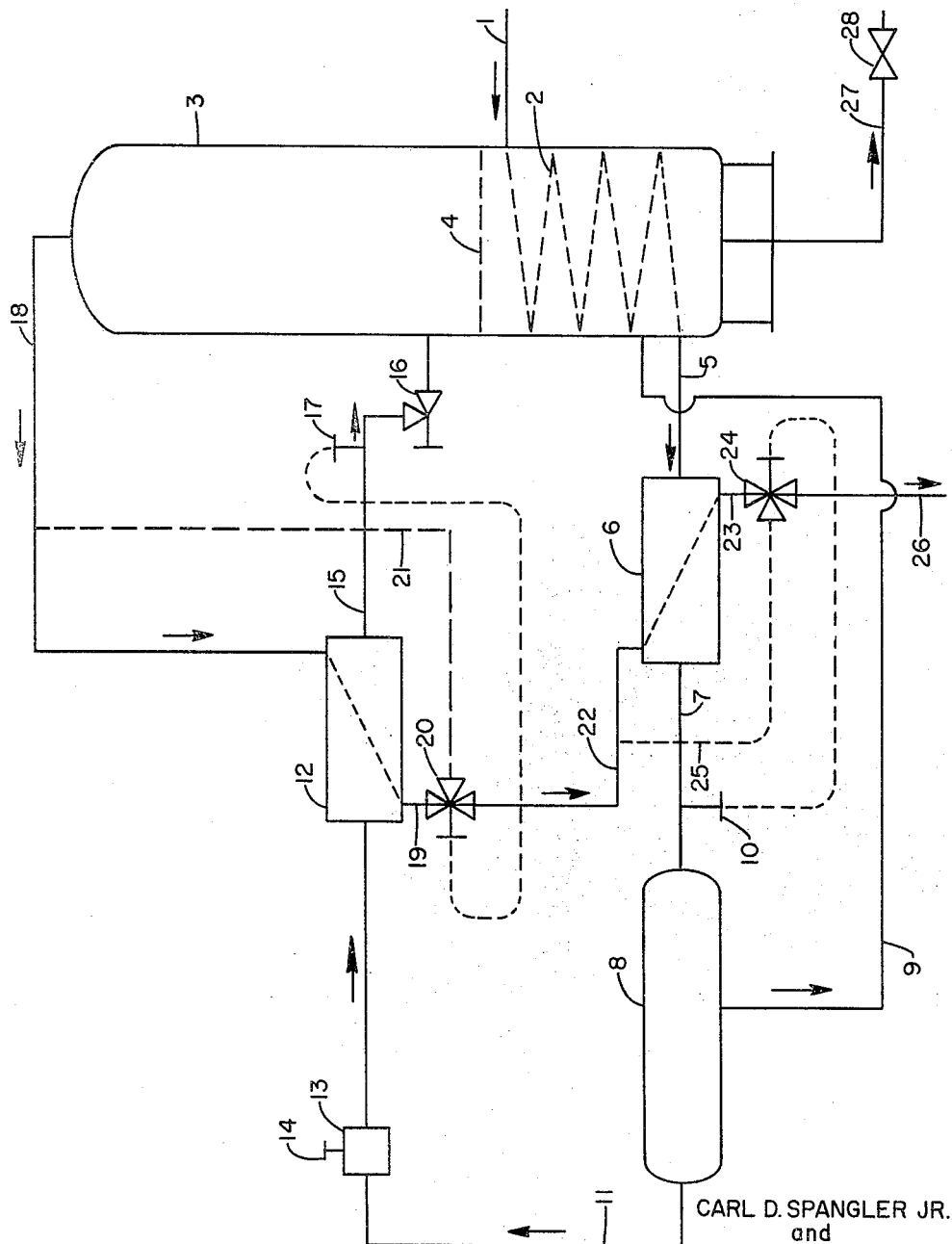
CARL D. SPANGLER JR.
and
LAWTON L. LAURENCE
*INVENTORS*
BY
*Jack R. Springate*
ATTORNEY

United States Patent Office 2,951,347
Patented Sept. 6, 1960

2,951,347

METHOD OF PROCESSING GAS

Carl David Spangler, Jr., Kansas City, Mo., and Lawton L. Laurence, Oklahoma City, Okla., assignors to Black, Sivalls & Bryson, Inc., Kansas City, Mo., a corporation of Delaware Filed Apr. 4, 1956, Ser. No. 576,209

1 Claim. (Cl. 62—20)

The present invention relates to the processing of high pressure natural gas to recover the desirable liquefiable constituents of the natural gas. More specifically, the present invention relates to the processing of natural gas at pressures within the retrograde condensation range and at low temperatures to recover the maximum amount of desirable liquefiable constituents of the natural gas.

For many years the phenomenon of retrograde condensation occurring in the processing of natural gas has been well known and utilized in methods of processing natural gas to recover the maximum amount of desirable liquefiable constituents. Reference should be made to the William H. Vaughan U. S. Patent 2,151,248, dated March 21, 1939, the Stuart S. Buckley U.S. Patent Re. 22,226, dated December 1, 1942 and the Arthur F. Barry U.S. Patent 2,528,028, dated October 31, 1950 as excellent examples of the methods practiced in processing high pressure natural gas prior to the present invention. The methods of these patents and other methods of processing natural gas have all been devoted to cooling the gas to provide maximum condensation or liquefaction of the desirable constituents while preventing the formation of hydrates or making provision for the melting of any hydrates formed. In these processes the major cooling of the flow stream is usually a result of the refrigeration effect attendant with the pressure reduction of the flow stream into a separation vessel. Where hydrate inhibitors are used additional cooling is usually provided ahead of the pressure reduction so that extremely low temperatures are reached in the separation vessel.

These previous processes therefore have divided themselves into two groups, those processes utilizing a hydrate inhibitor and those processes not utilizing a hydrate inhibitor. The processes in each group were subject to disadvantages. The inhibitor injection processes had the additional expense of equipment to inject the inhibitor, to separate the inhibitor from the desirable hydrocarbon condensates, to reconcentrate the inhibitor and to provide a reservoir of the reconcentrated inhibitor. Many processes have been developed with special emphasis on providing a minimum amount of equipment for each of the above additional steps in the process. The process group which does not utilize inhibitor injection is limited in the separation temperature which it can obtain since the stream cannot be cooler than the hydrate formation temperature of the stream when it reaches the choke or expansion step. Therefore, the condensate recovery is limited by the separation temperature which in turn is limited by the amount of available cooling due to expansion. This cooling is therefore dependent upon the initial pressure of the stream and the required pressure of the gas for delivery to sales gas lines. In many applications sufficient pressure drop is not available to recover substantially all the desirable hydrocarbons and the amount of desirable hydrocarbons lost for this reason will not justify the added cost of equipment necessary for adding hydrate inhibitor injection to the process.

Therefore, the primary object of the present invention is to provide a method of processing a high pressure natural gas which provides a maximum recovery of desirable liquefiable constituents of the gas wherein the operating temperatures of the unit may be lowered without the danger of a blocking of the system by hydrate formation and without the additional equipment usually necessary for separation, reconcentration and recirculation of a hydrate inhibitor.

Other objects of the present invention are to provide a method of processing a high pressure natural gas stream utilizing a controlled injection of a hydrate inhibitor to allow a low separation temperature without inhibitor separation from the condensates or inhibitor reconcentration; to provide a hydrate inhibitor injection system for processing a high pressure natural gas stream in which inhibitor is injected only in amounts sufficient to prevent critical hydrate formation as hereinafter described; and to provide an economical hydrate inhibitor injection system for processing a high pressure natural gas stream in which no attempt is made to recover the injected inhibitor.

In accomplishing these and other objects of the present invention we have provided improved methods illustrated by the accompanying drawing wherein:

The figure is a diagrammatic view of apparatus assembled to practice the methods of the present invention.

Referring to the figure for details of apparatus and formation of such apparatus in performing the methods of the present invention.

The high pressure gas stream from the wellhead or gathering system flows through high pressure gas inlet 1 into heating coils 2 within low temperature separator 3. The well stream is comparatively warm as delivered to inlet 1 because of the natural warmth of natural gas flowing from a wellhead or because of added heat supplied to the gas in gathering lines to prevent freezing. This warmth is utilized to warm the liquid and melt the gas hydrates collecting in the lower portion of low temperature separator 3.

To distinctly illustrate the advantages of the present invention a set of conditions of pressure, temperature and flow rates which are representative of a typical well stream of high pressure natural gas which may be processed economically by the methods of the present invention will be assumed. Thus, to illustrate the warmth of the high pressure gas stream, it will be assumed that the stream flows at a rate of approximately five million standard cubic feet per day at a temperature of 120° F. and a pressure of 3000 p.s.i.g.

Since heating coils 2 are positioned below liquid level 4 in the lower portion of separation vessel 3 the well stream will be cooled, for example, to a temperature of 110° F. in heat exchanger inlet duct 5. It should be noted that a slight pressure drop will be encountered in the flow through heating coils 2 and other portions of the system.

Thus the stream enters heat exchanger 6 at 110° F. and 2980 p.s.i. and is cooled to an outlet temperature of 80° F. At this pressure a normal hydrate formation temperature could be expected to be about 78° F. Therefore, care should be taken to regulate the amount of cooling of the stream in heat exchanger 6 so that the stream temperature in heat exchanger outlet duct 7 as sensed by temperature sensing member 10 is always at least 80° F. This cooling should be controlled to be as close to hydrate formation temperature as possible so that as much liquid as possible is condensed for removal from the gas stream in liquid separation. Thus, since the amount of hydrate inhibitor necessary to prevent hydrate formation is proportional to the amount of water and water vapor in the stream, the condensation and separation of the maximum amount of water will result in a use of the minimum amount of hydrate inhibitor; also, a reduction in the amount of liquid flowing through choke 16 will be another advantage incident to this step in our present method.

The cooled stream is dumped from duct 7 into liquid separator 8 where all liquids are discharged through liquid outlet 9 into separation vessel 3. These liquids being at a temperature of 80° F. will aid heating coil 2 to warm the liquids collecting in separation vessel 3.

The gas being free of liquid flows through gas outlet duct 11 and hydrate inhibitor lubricator 13 to heat exchanger 12. Lubricator 13 is designed to inject a small amount of a hydrate inhibitor such as methanol, for example, into the gas stream flowing to heat exchanger 12 through duct 11. A handle 14 on lubricator 13 is provided to adjust the amount of hydrate inhibitor which is injected in the stream. Also, since most lubricators are designed to work on the venturi principle, the amount of hydrate inhibitor injected under different rates of flow through duct 11 of the stream will be in proportion to the rate of flow for a particular setting of handle 14.

The stream is further cooled in heat exchanger 12 to temperatures below the normal hydrate formation temperature, for example to 64° F. This temperature in cold gas duct 15 is sensed by temperature sensing member 17 and controlled in response thereto as hereinafter described.

The stream is then expanded through choke 16 into separation vessel 3 where gas hydrates may be formed depending upon the rate of injection of the hydrate inhibitor. It is suggested that only sufficient hydrate inhibitor be used so that hydrate formation in duct 15 is prevented. The formation of gas hydrates in choke 16 will not be critical since the high velocities attendant to the expansion will prevent any build-up of hydrates which might block the flow line. The expansion of the stream through choke 16 and into separation vessel 3 should be adjusted to take full advantage of the well known phenomenon of retrograde condensation which occurs in the processing of natural gas. Also this expansion will provide a substantial amount of cooling of the stream due to the Joule-Thompson effect. This cooling and expansion will therefore cause condensation of desirable hydrocarbon components of the stream. Typical conditions of pressure and temperature of separation would be 1000 p.s.i. and 0° F. The condensed components and gas hydrates will fall or flow into the lower portion of separation vessel 3 and commingle with the liquids from liquid separator 8. These liquids are discharged from separation vessel 3 through liquid outlet duct 27 and valve 28 to storage or further processing units such as a fractionator.

The cold gas flows out of the top of separation vessel 3 through gas outlet duct 18 to heat exchanger 12. Valve 20 which is positioned in heat exchanger outlet duct 19 and by-pass duct 21 controls the amount of flow of cold gas through heat exchanger 12 and thus the amount of cooling of the stream in heat exchanger 12. Valve 20 is actuated in response to temperature sensing member 17. The temperature of the cold gas entering heat exchanger 12 would be approximately 5° F. and would be 29° F. on leaving heat exchanger 12 and entering heat exchanger 6. The cooling of the stream in heat exchanger 6 is controlled in response to temperature sensing member 10 by valve 24 which is positioned in heat exchanger outlet duct 23 and by-pass duct 25. The gas leaving valve 24 flows through duct 26 to a sales gas line (not shown) at an approximate temperature of 94° F. and a pressure of 990 p.s.i.

This method of processing natural gas has proven to be economical. Since the amount of inhibitor injected is small, and since no equipment needs to be provided for its recovery as would be necessary in a process utilizing the expensive recoverable inhibitors such as di-ethylene and tri-ethylene glycols, the additional recovery more than justifies the use of this method.

It may be assumed from the assumed conditions previously discussed that between two and five gallons of methanol would be used per million standard cubic feet of gas processed. The additional recovery of condensate made possible by the use of the present invention will command additional revenue which will amount to several times the cost of the inexpensive, non-recoverable inhibitor (such as methanol, salt solution, etc.) used. Thus, care should be taken to use only sufficient inhibitor to prevent critical hydrate formation as hereinafter defined and also to control temperatures of the stream throughout the system to be as close to hydrate formation temperature as possible without causing a critical hydrate formation. There is sufficient information in the prior art to calculate the amount of hydrate inhibitor necessary to perform in accordance with the method specifications of the present invention.

As used herein the term "critical hydrate formation" shall mean the formation of hydrates at a point in the process of a high pressure natural gas at which such hydrates will collect and eventually completely block the flow of the gas. Usually the formation of hydrates which occurs in the pressure reducing valve or in the separation vessel would not be considered critical since high gas velocities will free the valve and the heat from the vessel coil will melt hydrates forming in the vessel.

Thus, from the foregoing it may be seen that we have provided a new and novel method of processing high pressure natural gas to recover desirable condensible constituents thereof. We have also provided a method of processing such gas, utilizing a hydrate inhibitor injection in such small quantities as to render the additional equipment usually necessary for the recovery and reconcentration of the inhibitor economically unnecessary. Also, we have provided a new method of processing high pressure natural gas with hydrate inhibitor injection which method provides additional revenue beyond the cost of the inhibitor used. Further we have provided a method of processing high pressure natural gas wherein the amount of inhibitor injection is controlled so that its recovery is economically unnecessary. Also, we have provided a method of processing a high pressure natural gas stream wherein additional efficiency is obtained by initially cooling the stream to a temperature approaching hydrate formation temperature so that the maximum amount of liquids are removed from the stream before hydrate inhibitor injection. This latter feature allows a much greater efficiency in the use of the hydrate inhibitor.

What we claim and desire to secure by Letters Patent is:

The method of processing a high pressure natural gas to recover desirable liquefiable constituents comprising, initially cooling said gas to condense liquids therefrom, separating the condensed liquid from said gas, further cooling and expanding said gas into a liquid collecting zone to liquefy additional desirable constituents of said gas, injecting a hydrate inhibitor into said gas prior to expansion of said gas in amounts sufficient only to prevent critical hydrate formation, flowing said separated liquids into the liquefied constituents in said liquid collecting zone, heating said combined liquids to melt gas hydrates in said liquid collecting zone, and separating said desirable constituents from said gas.

References Cited in the file of this patent

UNITED STATES PATENTS

| | | |
|---|---|---|
| 2,245,028 | Farris | June 10, 1941 |
| 2,288,461 | Keith | June 30, 1942 |
| 2,306,553 | Miller | Dec. 29, 1942 |
| 2,342,165 | Plummer | Feb. 22, 1944 |
| 2,344,969 | Claffey | Mar. 28, 1944 |
| 2,475,957 | Gilmore | July 12, 1949 |
| 2,535,148 | Martin | Dec. 26, 1950 |

(Other references on following page)

UNITED STATES PATENTS

| | | |
|---|---|---|
| 2,565,569 | McCants | Aug. 28, 1951 |
| 2,582,148 | Nelly | Jan. 8, 1952 |
| 2,596,785 | Nelly | May 13, 1952 |
| 2,601,599 | Deming | June 24, 1952 |
| 2,690,060 | Legatski | Sept. 28, 1954 |
| 2,728,406 | Maner | Dec. 27, 1955 |
| 2,747,002 | Walker | May 22, 1956 |
| 2,758,665 | Francis | Aug. 14, 1956 |

OTHER REFERENCES

Dehydration of Natural Gas, Baker and Partridge, Oil and Gas Journal, pages 50–53, April 13, 1939.